United States Patent [19]

Pinkerton

[11] Patent Number: 4,786,306
[45] Date of Patent: Nov. 22, 1988

[54] INDIVIDUAL SECTION GLASS FORMING MACHINE

[75] Inventor: Steven J. Pinkerton, Ridgefield, Conn.

[73] Assignee: Emhart Industries, Inc., Farmington, Conn.

[21] Appl. No.: 152,694

[22] Filed: Feb. 5, 1988

[51] Int. Cl.⁴ .............................................. C03B 11/16
[52] U.S. Cl. ........................................ 65/163; 65/164; 65/320; 65/243; 65/330
[58] Field of Search ..................... 65/75, 163, 164, 70, 65/330, 320, 243

[56] References Cited

U.S. PATENT DOCUMENTS

| | | | |
|---|---|---|---|
| 2,702,444 | 2/1955 | Rowe | 65/243 X |
| 3,323,891 | 6/1967 | Donnelly | 65/320 X |
| 4,613,352 | 9/1986 | Krumme et al. | 65/164 X |
| 4,662,923 | 5/1987 | Vajda et al. | 65/163 X |

Primary Examiner—Arthur Kellogg
Attorney, Agent, or Firm—Spencer T. Smith

[57] ABSTRACT

The displacement of the plungers in a multi-gob individual section glass forming machine is monitored so that the location of the plungers, when each mold cavity has completely filled (parison formation point), can be determined. The desired location for the parison formation point for each plunger can be selectively chosen and the occurrence of these parison formation points can be synchronized to achieve fuller control over the parison formation process.

3 Claims, 3 Drawing Sheets

FIG. 4
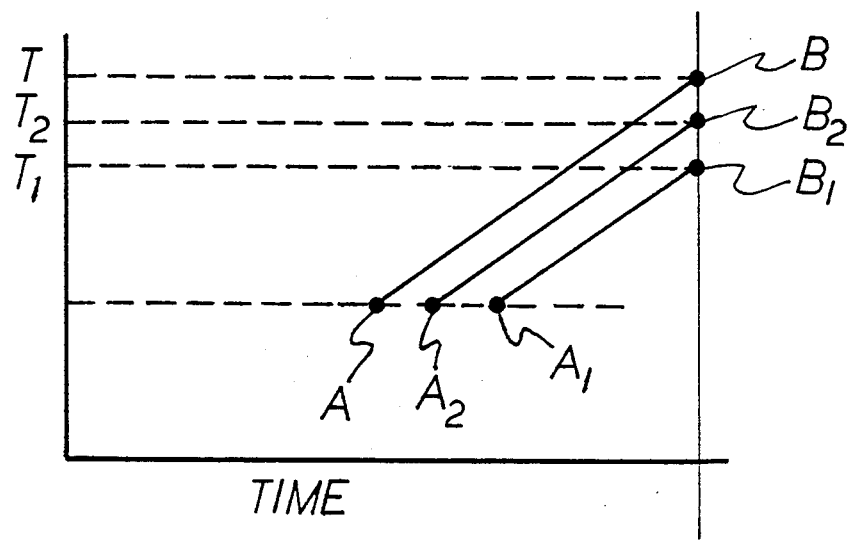
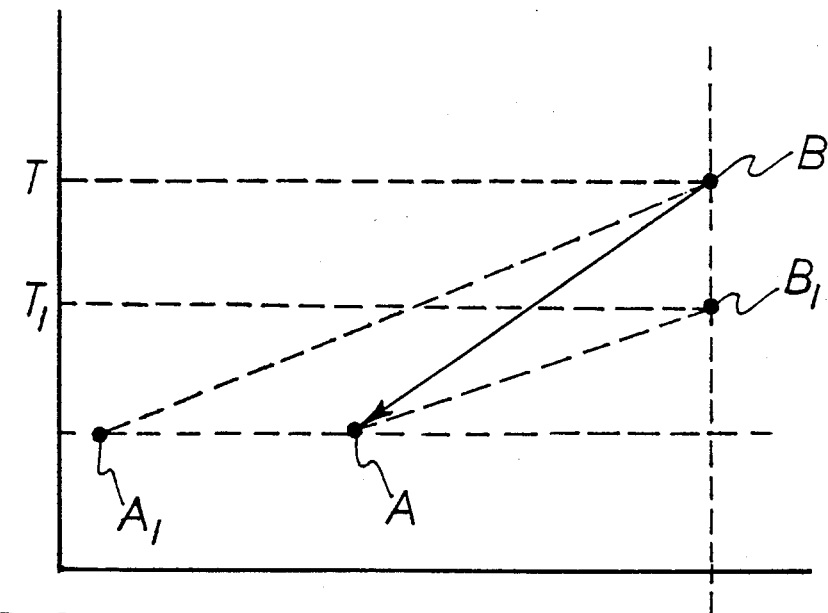
FIG. 5

INDIVIDUAL SECTION GLASS FORMING MACHINE

The present invention relates to the simultaneous forming of gobs of molten glass into parisons in a multigob, individual section, glass forming machine.

It is an object of the present invention to increase the uniformity of product made by such multigob, individual section, glass forming machines.

Other objects and advantages of the present invention will become apparent from the following portion of the specification and from the following drawings, which illustrate in accordance with the mandate of the patent statutes, a presently preferred embodiment incorporating the principles of the invention.

Referring to the drawings:

FIG. 4 is a graph illustrating the final temperature of parisons resulting from alternate paths of plunger movement during this final portion of movement; and FIG. 5 is a graph illustrating the final temperature of parisons resulting from other alternate paths of plunger movement during this final portion of movement.

Figure 1:
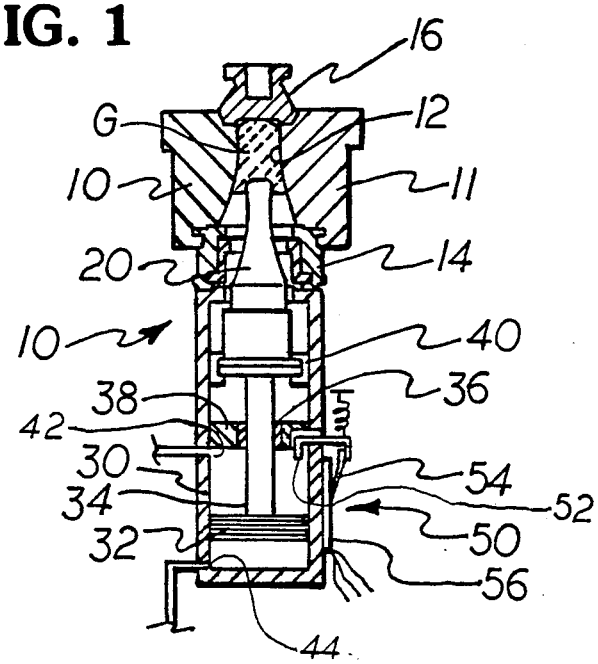
FIG. 1 is a diagrammatic view of one of the parison mold assemblies of an individual section, glass forming machine.

A glassware forming machine of the individual section, multi-gob type, has a number of individual sections each having a selected number (usually 2, 3 or 4) of parison mold assemblies 10 for simultaneously forming a corresponding number of parisons. Each of these mold assemblies 10 includes two mold halves 11 which are movable between an advanced position where they engage one another and other parts of the mold assembly to form a mold cavity 12 and a retracted position where the mold halves 11 are spaced to permit removal of a formed parison. A neck ring 14 cooperates with the mold halves 11 to define the cavity 12 and is arranged to grip the neck portion of a formed parison so that the parison can be transferred from the mold cavity to a blow mold. A baffle 16, movable into a position on top of the engaging mold halves 11, defines the upper surface of the mold cavity and is moved to a remote location prior to parison removal.

Each mold assembly also has a plunger mechanism including a plunger 20. The plunger 20 is first moved from its out-of-the-way position to its intermediate position where the plunger projects upwardly into the mold cavity. A gob of molten glass is dropped into the mold cavity 12 and rests on the plunger 20. The plunger is then advanced under a constant feed pressure from this intermediate position to press the glass against the walls of the cavity 12 to form the parison. In FIG. 1 the plunger is shown during its advancement from the intermediate position to its fully advanced position. The plunger is then retracted to its intermediate position by cutting the feed pressure and applying a retract pressure and then retracted from the intermediate position to the out-of-the-way position to allow for removal of the parison.

The plunger mechanism also has a cylinder 30, a piston 32 movable in the cylinder 30, and a piston rod 34 projecting from the piston 32 through a seal 36 in an upper end cap 38 of the cylinder 30. The plunger 20 is mounted on an upper end portion of the piston rod 34 by a clamping ring 40. Pressurized hydraulic fluid introduced into the cylinder 30 through an upper entry port 42 causes the piston 32 to move downwards in the cylinder 30, and the introduction of the fluid through port 44 causes the piston 32 to move upwardly in the cylinder 30.

Figure 2:
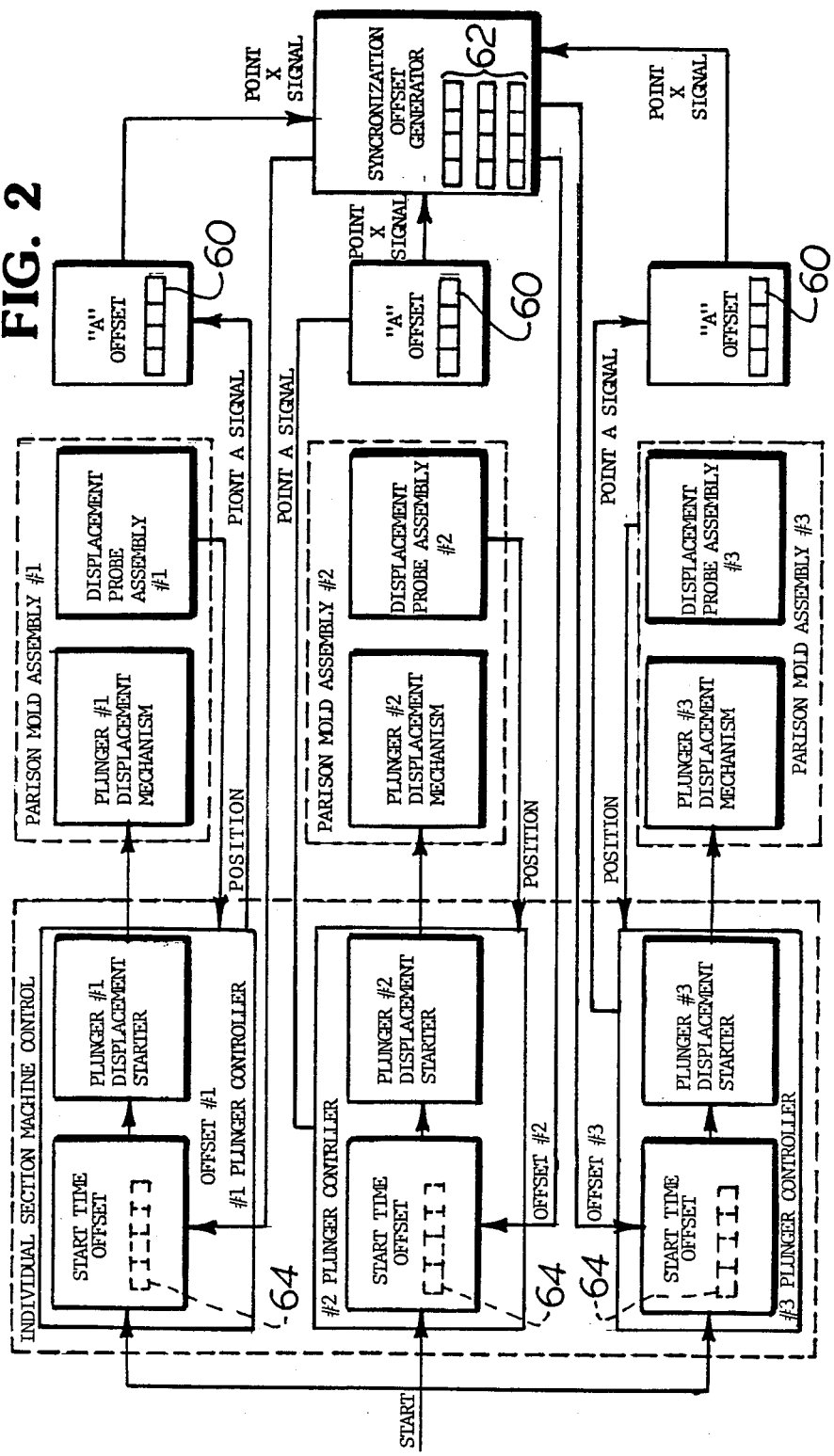
FIG. 2 is a schematic illustration of a triple gob, individual section, glass forming machine.

As can be seen from FIG. 2, each parison mold assembly also has a Plunger Displacement Mechanism (a valving arrangement which can alternately apply the feed and retract pressures to the appropriate cylinder ports 42, 44). The time when each pressure is applied is defined by a Plunger Displacement Starter and the other control parameters such as duration of application are controlled by a Plunger Controller (the plunger controllers are a part of the Individual Section Machine Control).

It is within the last $\frac{3}{8}''$ of plunger stroke that the mold cavity becomes completely filled in the narrow neck press and blow parison forming process. To track the displacement of each plunger throughout this portion of the stroke, each Parison Mold Assembly includes a Displacement Probe Assembly having a linear potentiometer 50 (FIG. 1) secured to the plunger housing 30. As a plunger is displaced through this $\frac{3}{8}''$, the piston 32 of that plunger will engage and displace a probe 52 to which is secured the potentiometer wiper 54. The displacement of this wiper 54 along the potentiometer element 56 changes the output of the linear potentiometer.

Figure 3:
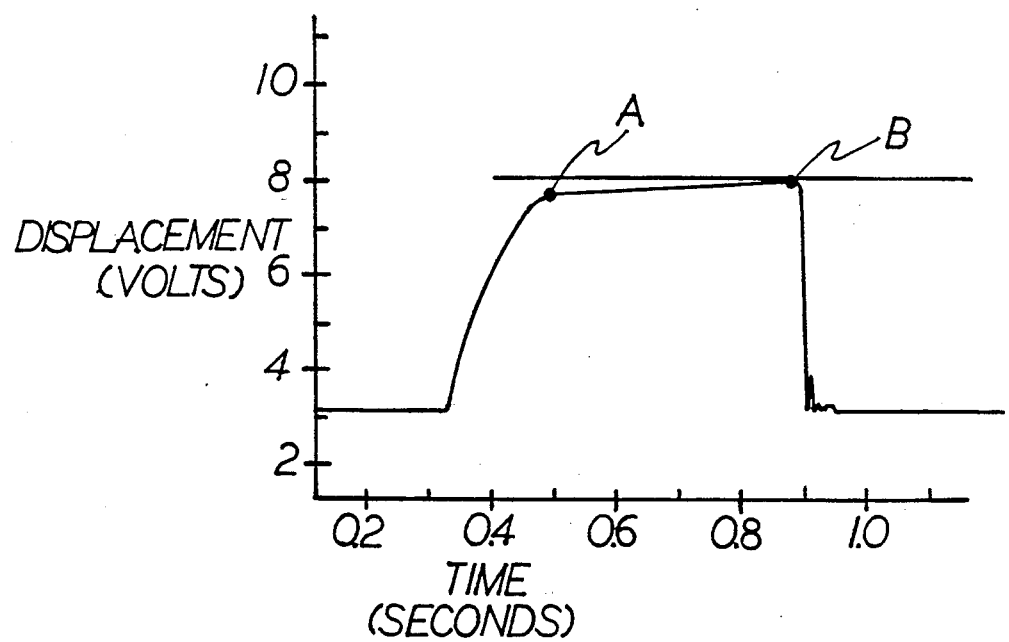
FIG. 3 is a graph illustrating the final portion of the movement of the mold assembly plunger in forming a parison.

FIG. 3 illustrates a plot of plunger displacement (voltage), as sensed by the probe, versus time, zero seconds being when the Plunger Displacement Starter commences plunger displacement (fires "plunger-up" solenoid, for example). This plot reveals a linear or constant velocity region between points A and B. Since the pressure is constant during this plunger advancement, the force exerted on the glass by the plunger remains constant. It is believed that point A is the point where the mold cavity has completely filled (the parison formation point) and that from point A to point B, the glass is cooling, and hence, shrinking.

Point B corresponds to the time when the Plunger Controller commences plunger retraction (fires "plunger-down" solenoid, for example). At this time, the parison has a specific temperature T (see FIG. 4). Accordingly, if one plunger reaches Point A behind schedule (A1 or A2), that parison will cool for a shorter period of time and the parison temperature (T1 or T2) will be higher than the temperature T of the third parison that has cooled from point A. Assuming that the three gobs, which are formed into these three parisons are identical, Point A is the time when all the parisons should be formed if they are all to cool to the desired temperature T when the plunger is retracted at Point (time) B. This also assumes that all three parisons cool at the same rate.

The Plunger Controller for each plunger, which receives positional data from its associated Displacement Probe Assembly determines when Point A has been reached (has determined that the displacement curve has become linear), and supplies this data to a Synchronization Offset Generator which determines the time differences between the three Position A Signals.

The Synchronization Offset Generator then supplies time offsets (negative) to the Start Time Offset for the Plunger Controllers for the two plungers which arrived at their Point A after the third plunger arrived at its Point A. These offsets accordingly synchronize the plungers (assure that all three plungers reach the parison formation point at the same time). These offsets are updated every cycle to adjust for pressure or other variations.

The slope of the section from Point A to Point B may not, however, be the same for all of the parison mold assemblies. Referring to FIG. 5, if the cooling rate for the middle mold in a triple gob individual section machine cools at a slower rate than an outer mold, the slope of this section may be AB for an outer mold and AB1 for the middle mold. The temperature T of the outer parisons will accordingly be less than the temperature T1 of the middle parison. To increase or decrease the cooling time of a mold so that the mold will cool to Point B, "A offsets" can be selectively programmed via suitable thumb wheel switches 60. The feed cycle for this middle plunger can accordingly be advanced relative to the outer mold so that this section will conform to section A1B, rather than section AB1, and hence, will cool to temperature T rather than to temperature T1.

The Synchronization Offset Generator compares signals (Point X Signals), which should arrive at the same time. These signals will be Point A Signals when no A Offsets have been defined. As a result, A offsets can be set without altering the operation of the Synchronization Offset Generator.

The Synchronization Offset Generator includes Position X readouts 62, which in a manual system, can be relied on by an operator to define the offsets which can be inputted into the start time offsets via conventional thumb wheel switches or the like 64.

I claim:

1. A multi-gob individual section, glass forming machine comprising
    a plurality of parison mold assemblies each including a plunger displaceable from a retracted position to a fully inserted position,
    means for displacing each plunger from said retracted to said fully inserted position, said plungers advancing to a parison formation point where the mold cavity has become completely full and then to the fully inserted position as the formed parison cools,
    means for starting said displacing means at a predetermined time,
    means for sensing the actual position of each of said plungers throughout at least the last portion of its displacement which includes the parison formation point,
    means for determining when each plunger, during said portion of its displacement, is located at said parison formation point and for issuing a parison formation point signal, and
    means for offsetting the start times of said starting means to synchronize the parison formation points of said plungers.

2. A multi-gob individual section, glass forming machine according to claim 1, wherein said offsetting means comprises
    start time offset means for each of said starting means,
    means for receiving said parison formation point signals and for computing the difference in time between the first issued parison formation point signal and the other subsequently issued parison formation point signals, and for setting each of the plunger displacement starting means for each of the other plungers by the time difference between said first parison formation point signal and the arrival of the other parison formation point signal.

3. A multi-gob individual section, glass forming machine according to claim 2, further comprising means for selectively offsetting any one of said parison formation point signals.

* * * * *